(12) United States Patent
Gloudemans et al.

(10) Patent No.: US 8,456,526 B2
(45) Date of Patent: Jun. 4, 2013

(54) VIDEO EFFECT USING MOVEMENT WITHIN AN IMAGE

(75) Inventors: James R. Gloudemans, San Mateo, CA (US); Walter Hsiao, Mountain View, CA (US); John LaCroix, Oakland, CA (US); Richard H. Cavallaro, Mountain View, CA (US); Marvin S. White, San Carlos, CA (US)

(73) Assignee: Sportvision, Inc., Chicago, IL (US)

( * ) Notice: Subject to any disclaimer, the term of this patent is extended or adjusted under 35 U.S.C. 154(b) by 1716 days.

(21) Appl. No.: 11/467,467

(22) Filed: Aug. 25, 2006

(65) Prior Publication Data
US 2008/0049123 A1   Feb. 28, 2008

(51) Int. Cl.
*H04N 7/18* (2006.01)
(52) U.S. Cl.
USPC .......................................................... 348/157
(58) Field of Classification Search
USPC .......... 348/143, 157, 169, 189, 211; 382/106; 725/112; 386/46; 345/427
See application file for complete search history.

(56) References Cited

U.S. PATENT DOCUMENTS

| | | | |
|---|---|---|---|
| 6,304,665 B1 * | 10/2001 | Cavallaro et al. | 382/106 |
| 6,741,250 B1 * | 5/2004 | Furlan et al. | 345/427 |
| 7,149,549 B1 | 12/2006 | Ortiz | |
| 2001/0026319 A1 * | 10/2001 | Honey et al. | 348/169 |
| 2002/0005902 A1 * | 1/2002 | Yuen | 348/211 |
| 2003/0177503 A1 * | 9/2003 | Sull et al. | 725/112 |
| 2004/0155965 A1 * | 8/2004 | Jaynes et al. | 348/189 |

* cited by examiner

*Primary Examiner* — Allen Wong
(74) *Attorney, Agent, or Firm* — Vierra Magen Marcus LLP (57) ABSTRACT

A video effect is created that provides an experience to a viewer of freezing time during an event that is the subject of a video presentation, investigating the event during that frozen moment in time, and (optionally) resuming the action of the event. During that frozen moment in time, the video can move around the scene of the event and/or zoom in (or out) to better highlight an aspect of the event. In one embodiment, there will be a transition from video captured by a broadcast camera (or another camera) to a high resolution still image, movement around the high resolution still image, and a transition from the high resolution still image back to video from the broadcast camera (or another camera).

17 Claims, 11 Drawing Sheets

VIDEO EFFECT USING MOVEMENT WITHIN AN IMAGE

BACKGROUND OF THE INVENTION

Description of the Related Art

The remarkable, often astonishing, physical skills and feats of great athletes draw millions of people every day to follow sports that range from the power of football to the grace of figure skating, from the speed of ice hockey to the precision of golf, etc. Sports fans are captivated by the abilities of a basketball player to soar to the rafters, of hockey players to make that perfect pass, of football teams to exploit the weaknesses of the defense, etc. In televising these events, broadcasters have deployed a varied repertoire of technologies ranging from slow motion replay to lipstick sized cameras mounted on helmets to highlight for viewers these extraordinary talents.

One aspect of televising sporting events that has been limiting is the field of view and resolution of the broadcast cameras. When a camera is depicting a portion of an event, the viewers will miss action occurring at other portions of the event. For example, a camera showing video of a quarterback in a football game will not likely be showing the athleticism of the players down the field preparing to receive a pass from the quarterback or what the QB has to work with when deciding who to throw the ball to. Similarly, the resolution of many video cameras does not allow for sufficiently zooming in during a reply to show the viewers aspects of the event not clear in the original video.

SUMMARY OF THE INVENTION

A video effect is created that provides an experience to a viewer of freezing time during an event that is the subject of a video presentation, investigating the event during that frozen moment in time, and (optionally) resuming the action of the event. During that frozen moment in time, the view can move around the scene of the event and/or zoom in to better highlight an aspect of the event. In one embodiment, there will be a transition from video captured by a broadcast camera (or another camera) to a high resolution still image, movement around the high resolution still image, and a transition from the high resolution still image back to video from the broadcast camera (or another camera).

One embodiment includes identifying a particular video image and a corresponding base image, identifying one or more sub-images in the base image, and creating a new video that includes a transition from the particular video image to the base image and includes movement in the base image to the one or more sub-images. In some implementations, the particular video image depicts a portion of the base image. Because the base image and particular video image may come from different cameras, while the particular video image depicts a portion of the base image the particular video image will not be exactly the same as the portion of the base image on a pixel by pixel basis. Rather, the will visually show the same subject in a reasonably similar manner.

One embodiment includes identifying a first sub-image in a base image, identifying a portion of the base image that corresponds to a particular video image, and creating a video that transitions from the video image to the portion of the base image and includes movement in the base image from the portion of the base image to the one or more sub-images.

One embodiment includes receiving an electronic base image, receiving an indication of a set of two or more target images in the electronic base image, creating a set of electronic intervening images in the electronic base image that are between the target images, and creating a video from the target images and the intervening images.

One embodiment includes receiving a higher resolution video sequence in the vicinity of the camera, transmitting a normal (standard definition or high definition) resolution video sequence live with each image being a subimage of one of the images in the higher resolution video sequence, also identifying a particular normal resolution video, and creating a new video that includes a transition from the particular video image to the base image and includes movement in the base image to the one or more sub-images. The particular video image depicts a portion of the base image.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. The software can be used to program one or more processors to perform the various methods described herein. The one or more processors are in communication with the storage media and one or more communication interfaces. In alternative embodiments, some or all of the software can be replaced by dedicated hardware including custom integrated circuits, gate arrays, FPGAs, PLDs, and special purpose computers.

This Summary is provided to introduce a selection of concepts in a simplified form that are further described below in the Detailed Description. This Summary is not intended to identify key features or essential features of the claimed subject matter.

DETAILED DESCRIPTION

A video effect is created that provides an experience to a viewer of freezing time during an event that is the subject of a video presentation, investigating the event during that frozen moment in time, and (optionally) resuming the action of the event. During that frozen moment in time, the video can move around the scene of the event and/or zoom in (or out) to better highlight an aspect of the event.

One embodiment of the system will use a high resolution digital camera co-located with a broadcast video camera. The digital camera will be a locked down within 5 feet of the broadcast camera (mounted to a rail, a wall, or the broadcast camera) so that it sees the entire (or a larger portion of the) field of play. The digital camera will have an associated computer located a short distance from it (at the broadcast camera position). From this location the video/image/data will be transmitted to a production center (e.g., production truck) over fiber, coax or other transmission medium. The production center will house a work area for an operator, one computing system, and a storage system.

In one embodiment, when something interesting occurs during an event, the operator will push a button (or otherwise actuate a different input device) causing the system to "freeze" its buffer of base images as well as the video buffer of video images (high definition or standard definition) from the associated broadcast camera. At this point the operator will use the user interface to select one of the base images from the digital camera for the moment in time to be frozen. Upon selecting the base image, the associated frame of broadcast video frame closest in time will be identified from the video buffer. This will be the break point in the video stream from which the video effect will transition into the frozen world (and, optionally, back).

To build the video effect, the operator will identify the location and framing of one or more points of interest (sub-images) in that base image, thereby, creating a script for the video effect. The script identifies sub-images in the base image, the order of the sub-images, and the zoom level to show each sub-image. Once the script is created, the processing system will create/render the new video and save it for broadcast or other purposes. The newly created video will include the broadcast video that leads into the frozen shot (a predetermined lead-in duration) followed by a transition to the corresponding framing in the base image, followed by a smooth move to each of the sub-images identified by the operator (with a preset pause at each one), and finally a smooth transition back to the original framing (where the video will transition back to the broadcast video to resume action).

Figure 1:
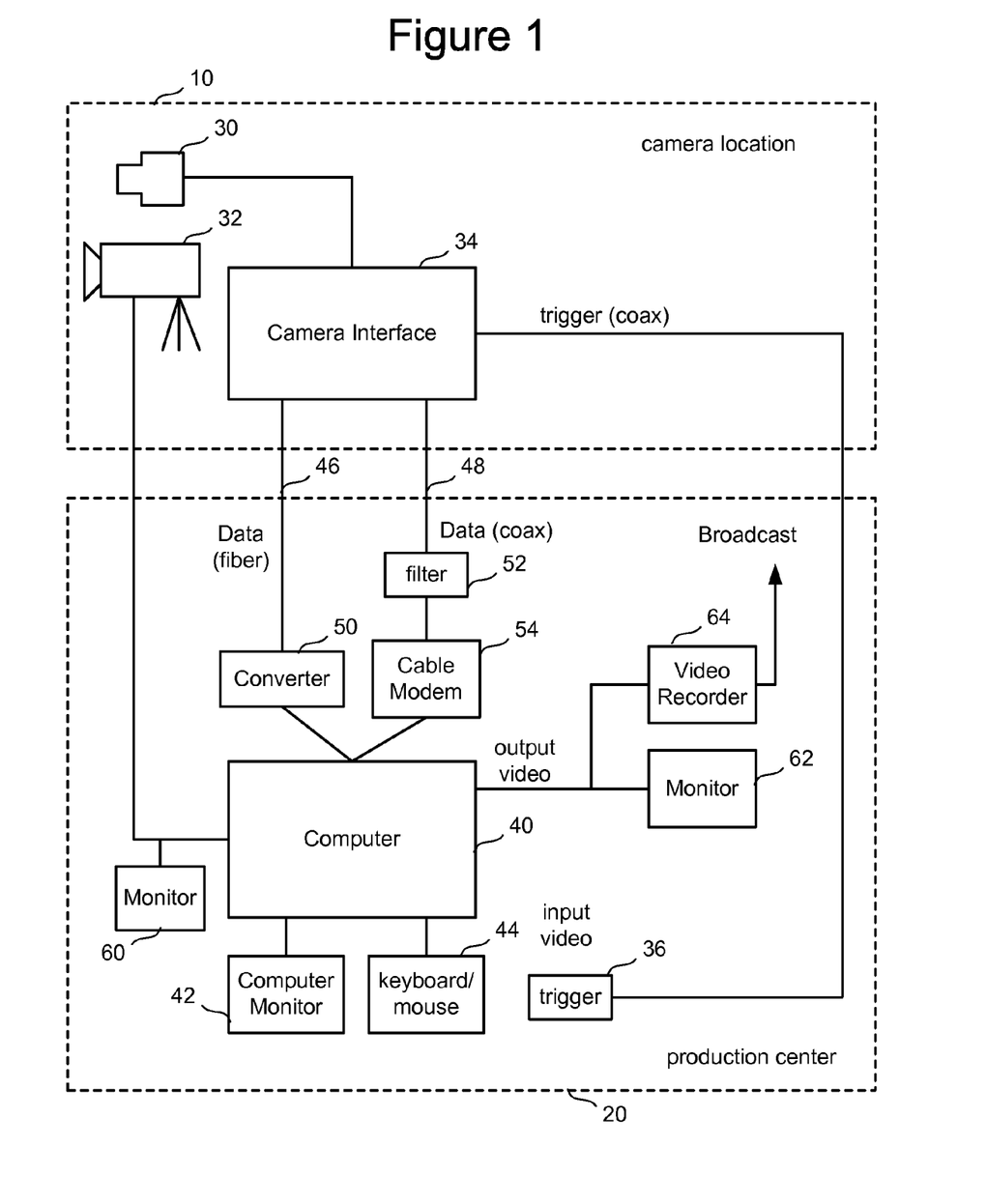
FIG. 1 is a block diagram of one embodiment of a system for creating a video effect.

FIG. 1 is a block diagram of one embodiment of a system for creating a video effect. The system of FIG. 1 includes components at two locations: camera location 10 and production center 20. In some instances, the system depicted in FIG. 1 will be operated at an event (e.g., a sporting event) being broadcast on television using one or more broadcast cameras. Camera location 10 includes one of those cameras being used to broadcast the event. It is contemplated that there can be multiple cameras broadcasting a live event and, thus, there will be multiple instances of the hardware components of camera location 10 in communication with production center 20. Production center 20 can be near or remote from any one of the camera locations 10. In one embodiment, the system is used during the broadcast of a sporting event, camera location 10 will be inside the arena or stadium, and production center 20 will be inside a truck in the parking lot of the stadium. In other embodiments, production center 20 can be at a studio far from the arena or stadium, or production center 20 can be inside the arena or stadium.

Camera location 10 includes a digital still camera 30 and a broadcast video camera 32. Digital still camera 30 is in communication with camera interface 34. In some embodiments, digital still camera 30 is mounted on the lens (or otherwise attached to the camera for) broadcast video camera 32. In other embodiments, digital still camera 30 can be located near video camera 32. For example, digital camera 30 can be rigidly mounted (i.e. not able to pan or tilt) on a wall, platform, handrail, etc. very close to broadcast video camera 32. One example of a suitable digital still camera is the Canon 1DsMKII. However, other digital still cameras can also be used. In one embodiment, each of the images captured by the digital still camera 30 comprises eight megapixels. In other embodiments, the digital pictures can be sixteen megapixels or a different resolution. Broadcast camera 32 can be any suitable broadcast camera known in the art.

In other embodiments, instead of using a digital still camera, camera 30 can be a digital video camera which outputs video images at a fixed interval. In yet another embodiment, camera 30 can be another type of sensor that can provide electronic images to computer 40. In one example, camera 30 can be an analog broadcast camera and camera interface 34 can convert the analog video signals to digital video images or other types of electronic images.

In other embodiments, instead of using a digital still camera, camera 30 can be omitted and camera 32 can be a very high resolution camera connected to computer interface 34 (as well as the connection to computer 40). In some embodiments, computer interface 34 has large recording capability.

Production center 20 includes a computer 40. In one embodiment, computer 40 includes dual 2.8 GHz P4 Xenon processors in communication with 4 GB of RAM, an NVidia Quattro FX 4000 video card, an Aja HD video card (in other embodiments a SD video card can also be used in addition to or instead of) and an Ethernet card. In another embodiment, computer 40 can include a Super Micro PD5GE Motherboard, 4 GB DDR2 RAM, Intel PD840 3.2 GHz Processor, NVidia Quattro FX 4000, Aja Xena HD Card, 250 GB Hard Drive, Ethernet card and Lite-On 16×DVD+RW. Other computer configurations can also be used. Broadcast video camera 32 sends its images to the video card (or other interface) on computer 40. Computer 40 stores the received video as electronic digital video images. In one embodiment, broadcast video camera 32 sends 30 frames of video per second. In other embodiments, 60 frames per second can be sent or another rate can be used. Each of the frames will be stored in a video buffer on a hard disk for computer 40. In one embodiment, the video buffer holds 15 seconds of HD video or 30 seconds of SD video. Other sizes for the video buffer can also be used.

Computer 40 includes a monitor 42 and keyboard/mouse 44, all of which are used to implement the user interface. Camera 32 is connected to monitor 60 which displays the video received from camera 32. Computer 40 is also connected to a monitor 62 for showing the output video. The output video is also provided to a video recorder 64. From the video recorder, the output video can be provided for broadcasting as part of the television production of the event being captured by broadcast video camera 32.

Camera interface 34 is used to control digital camera 30 and receive images from digital camera 30. Camera interface 30 sends the digital images to computer 40 via either a fiber data line 46 or a coaxial data line 48 (or other transmission mediums such as wireless, parallel twisted pairs, etc.). In some embodiments, both the fiber and the coaxial lines will be used. In other embodiments, only one of the lines will be used. The fiber optic line from camera interface 34 is connected to a converter 50, which converts fiber data to Ethernet and provides the information to an Ethernet card for computer 40. Data sent on coaxial line 48 is sent through a filter (e.g., Humbucker filter) which filters out 60 cycle noise. The output of the filter is sent to a cable modem which provides the data to the Ethernet card for computer 40

FIG. 1 shows a trigger switch 36 which is connected to camera interface 34. An operator at production center 20 can push the trigger switch 36 in order to trigger camera 30 to take a picture. In one embodiment, the trigger switch can be located at camera location 10. In another embodiment, instead of using trigger switch 36, camera 30 will automatically take pictures at a set interval. In another embodiment, a user can continually actuate (e.g. push) trigger 36 in order to cause camera 30 to continually take pictures at a fixed interval. In another embodiment, instead of using a fixed camera 30, digital images can be acquired during or after an event from professional photographers at the event.

In another embodiment, an additional computer can be used at the production center 20. This additional computer will act as a video server, receiving the video from camera 32 and storing all of the video for an event on a hard disk drive or other storage medium. This video server will synchronize its time with computer 40 via an Ethernet connection. Each frame (or field or other unit) of video stored will be provided with a time stamp by the video server. Similarly, computer 40 will add the offset between computer 40 and the video server to the data for the still images corresponding in time. When a video effect is being created, as described below, computer 40 will access the necessary frames of video from the video server. In such a case, there will not be the same time limitation for deciding whether to create a video effect as described below.

Figure 2:
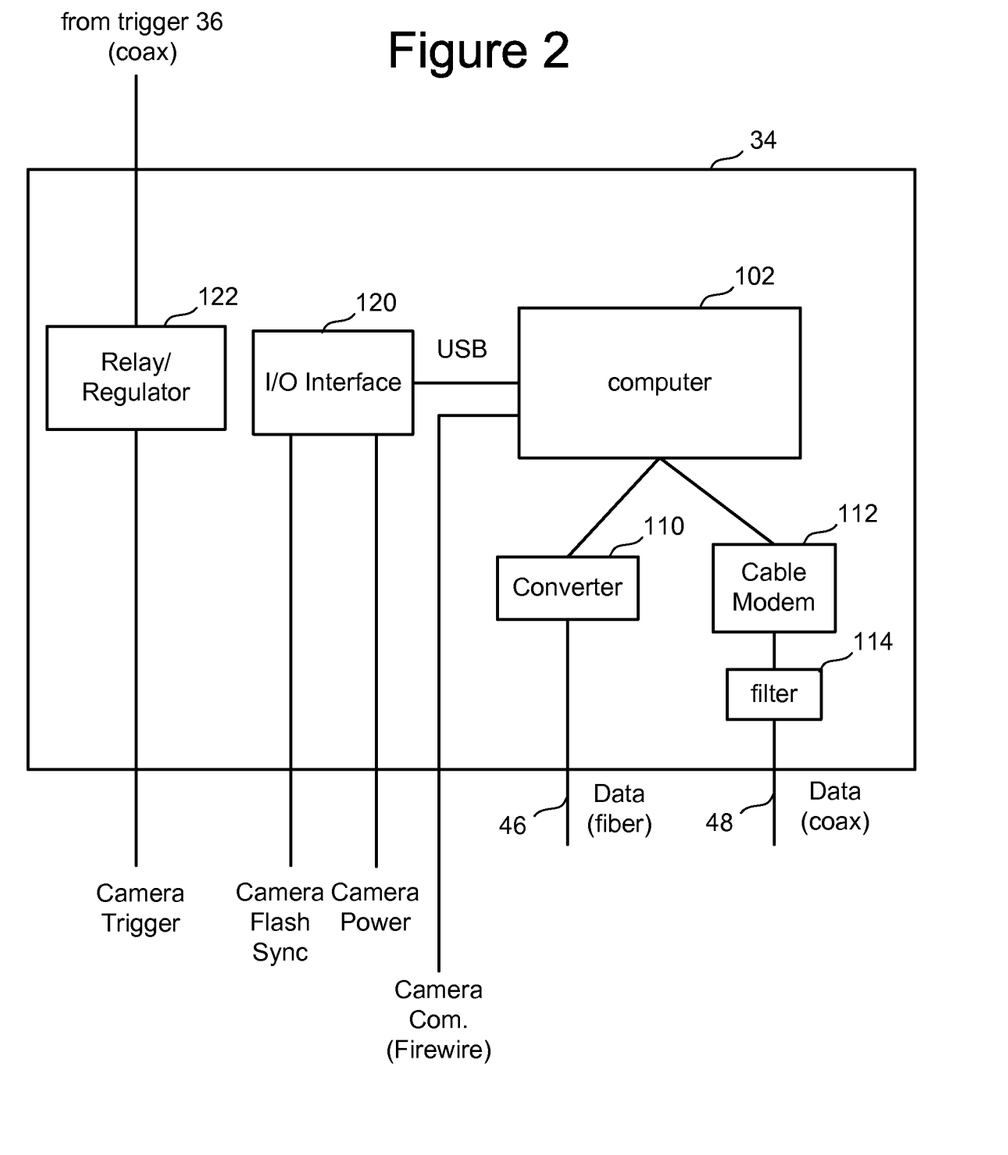
FIG. 2 is a block diagram of one embodiment of a camera interface.

FIG. 2 is a block diagram describing details of camera interface 34. FIG. 2 shows computer 102 connected to converter 110, cable modem 112, and I/O interface 120 (via USB line). In one embodiment, computer 102 is connected to either converter 110 or cable modem 112, but not both. Converter 110 is used to convert Ethernet data to fiber optic data for transmission to computer 40 via fiber line 46. Cable modem 112 is used to convert Ethernet data to coaxial cable data for transmission on coaxial cable 48 via filter 114. Computer 102 is also connected to camera 30 via a firewire connection. This firewire connection is used to control camera 30 and to receive images from camera 30. For example, computer 102 can control aperture, shutter speed, color balancing, zoom and other camera settings. In one embodiment, computer 102 is a Toshiba Libretto U100. Computer 102 can also be used to control the shuttering of camera 30. However, other computers can also be used.

I/O interface 120 communicates with computer 102 via a USB port for computer 102. In one embodiment, I/O interface 120 is an OnTrak ADU200. I/O interface 120 is connected to the flash sync connection for camera 30 and the power connection for camera 30 so that computer 102, via I/O interface 120, can turn the camera on and off, provide power to the camera, and detect when the flash is commanded on the camera. In one embodiment, every time the camera takes a picture the flash is used (or commanded). In another embodiment, rather than detecting flash commands, the camera will provide an indication that the shutter opened and closed, or another indication that a picture was taken. That indication is provided to I/O interface 120 and communicated to computer 102. When computer 102 receives an indication that a picture was taken, computer 102 will note the time that the picture was taken. Computer 102 will then wait for the camera to send the image via the firewire connection to computer 102. Computer 102 will package the image, a timestamp indicating the time the image was taken, and the size of the image into a data structure. In one embodiment, the image is stored as a .jpg file. In other embodiments, other file formats can be used. That data structure is then communicated to computer 40 via either the fiber line 46 or coaxial line 48 (or other means)

FIG. 2 also shows the trigger line from trigger 36 connecting to a relay and regulator 122. From the relay and regulator 122, the trigger signal is provided to the camera trigger in order to trigger camera 30 to take a picture. In one embodiment, the relay/regulator 122 includes a regulator for converting the voltage from the source voltage (e.g., 110 volts or 120 volts) to 5 volts. The relay is used to isolate ground.

Computer 40 will receive the digital still images from camera 30 and the video images from camera 32. At any point during an event, a user may decide that something interesting has happened (or is about to happen) and request the system to create a video effect. At that time, the buffers storing the digital images and the video image will be frozen, the user will choose a digital still image as the base image for the effect, computer 40 will determine which video image most nearly corresponds to the chosen base image, and the user will be provided with the opportunity to create a script for the video effect. In response to the script, computer 40 will create the video effect and build a new video which includes the video effect, a transition from the video stream from camera 32 to the video effect, and a transition back from the video effect to the camera stream. The created video effect includes video depicting virtual camera movement within the frozen base image.

In one embodiment, computer 102 of camera interface 34 and computer 40 at production center 20 will synchronize their clocks so the timestamps added to the images will be relevant to both computers. In one embodiment, computer 102 will send its time to computer 40 five times a second (or at another interval). Each instance that computer 102 sends its time to computer 40, computer 40 will note the offset between the time from computer 102 and the time on the clock local for computer 40. Thus, computer 40 will maintain an offset between the two different clocks. In other embodiments, other intervals or methods can be used for synchronizing the two clocks.

Figure 3:
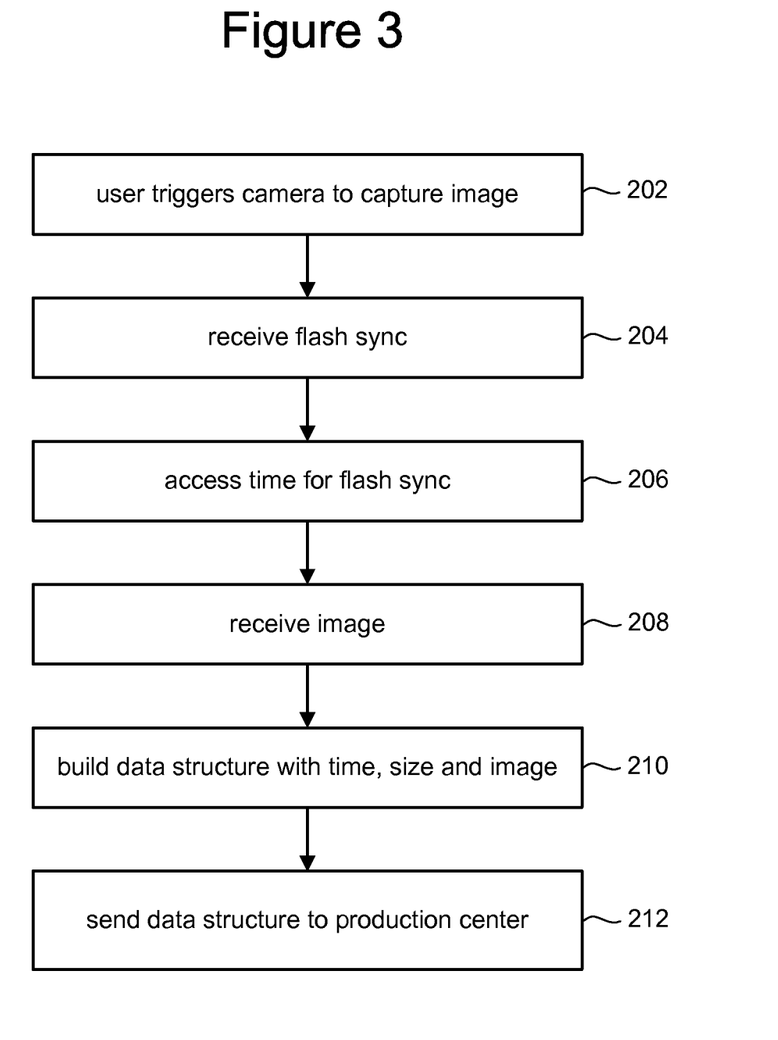
FIG. 3 is a flow chart describing one embodiment of a process performed at the camera interface.

FIG. 3 is a flowchart describing one embodiment of a process performed at the camera location 10. In step 202, a user will trigger camera 30 to capture one or more images. Note that the user may be at production center 20 or another location. In response to the trigger, the camera will take one or more pictures and camera interface 34 will receive a flash sync signal (or other indication of a picture) in step 204. In response to receiving that flash sync signal, computer 102 will access its clock to determine a timestamp for the image in step 206. In step 208, computer 102 will receive the image via the firewire connection from camera 30. In step 210, computer 102 will build the data structure which includes the image, the time the image was taken and the size of the image. In step 212, that data structure will be sent to production center 20 via either fiber data line 46 or coaxial data line 48.

Figure 4:
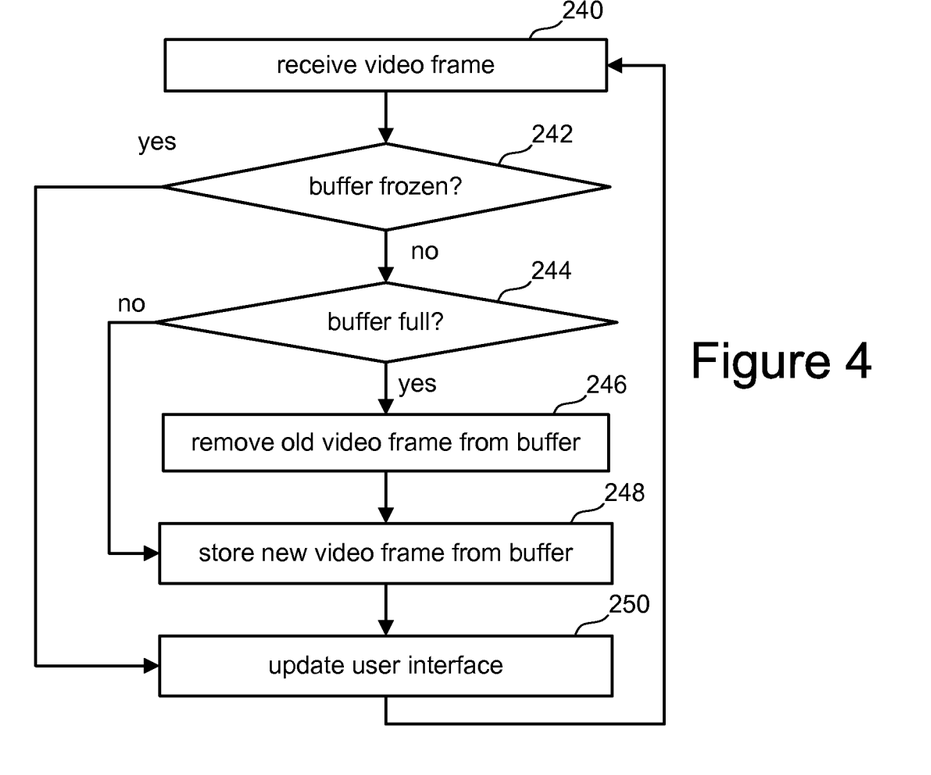
FIG. 4 is a flow chart describing one embodiment of a process for receiving video.
Figure 5:
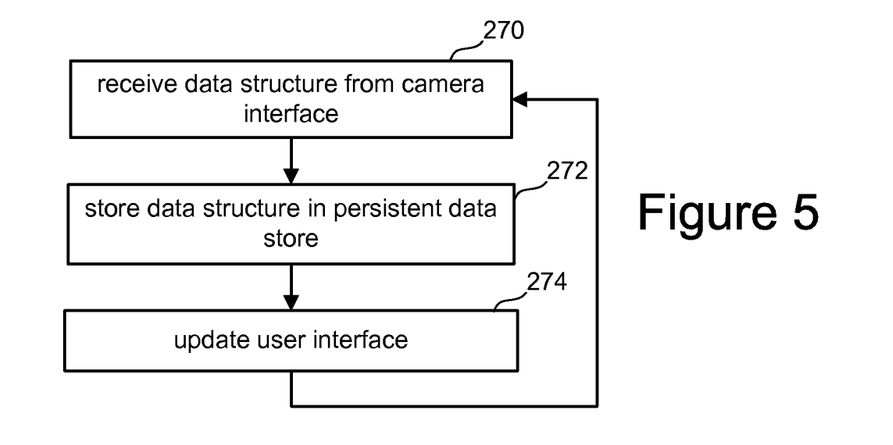
FIG. 5 is a flow chart describing one embodiment of a process for receiving base images.

As described above, computer 40 will receive video images from camera 32 and still images from camera interface 34. FIG. 4 is a flowchart describing one embodiment of the process for computer 40 to receive video images from camera 32. FIG. 5 is a flowchart describing one embodiment of the process for camera 40 to receive still images from camera interface 34.

In step 240, of FIG. 4, computer 40 receives a frame of video from broadcast camera 32. In other embodiments, a computer 40 can receive a field (e.g., odd or even) of video at a time or another quantity. Computer 40 maintains a buffer of video images received. In step 242, it is determined whether that buffer is frozen. If the buffer is frozen, then no more video frames can be stored in that buffer and the process loops to step 250 (discussed below) without storing the video frame received. If the buffer is not frozen, then it is determined in step 244 whether the buffer is full. If the buffer is full, then the oldest video frame in the buffer is removed in step 246 and the new video frame is stored in the buffer in step 248. If, at step 244, it is determined that the buffer was not full, then the process would move directly to step 248 and store the new video frame in the buffer. In step 250, the user interface for computer 40 will be updated, as described below. Note that computer 40 will add a timestamp to each video frame it receives from broadcast camera 32. In another embodiment, broadcast camera 32 (or another device) could automatically add a timestamp before sending a video image (or portion thereof) to computer 40.

In step 270 of FIG. 5, computer 40 receives a data structure from camera interface 34. In step 272, computer 40 stores that data structure in a persistent data store. In one embodiment, step 272 will also include adding the offset between the two clocks (described above) with the data structure. In step 274, the user interface is updated, as described below, and the process loops back to step 270 to capture another frame).

Computer 40 includes a user interface which provides various controls for the operator as well as various video outputs. In one embodiment, the user interface will display the video from broadcast camera 32 and have a list of still images received from camera 30. Each still image received from camera 30 is identified in the user interface by the name of the file, the time of the image, the amount of video in the video buffer with timestamps before the timestamp for still image and the amount of video in the video buffer with timestamps after the timestamp for the still image. Once the video buffer is updated so that there is no video in the video buffer that is before the timestamp for a still image, then that still image cannot be used as a base image for creating the video effect (in one embodiment); therefore, that still image can then be removed from the user interface. In some embodiments, all broadcast video frames can be stored and thus still images will not be removed from the user interface. A user can click on any one of the file names in the list of still images and the user interface will display that still image. Step 250 of FIG. 4 includes updating, for each still image listed in the user interface, the indications of the amount of video in the video buffer with timestamps before the timestamp for still image and the amount of video in the video buffer with timestamps after the timestamp for the still image. Step 276 of FIG. 5 includes adding and removing digital images from the user interface.

The user interface includes a set of controls to manage various parameters of camera 30. The user interface also includes a set of controls to manage various parameters for creating the videos. For example, there are parameters that indicate the length of the leader video, the length of the trailer video, the maximum amount of zoom in the video effect, the mid-point zoom between sub-images, the pan, tilt, and zoom rates of the video effect between sub-images, and pause time at each of the sub-images. Other controls and parameters can also be included. Most of these parameters are defaults, minimums, maximums, etc. The video effect can accelerate and decelerate up to the maximum pan, tilt, and zoom rates (perhaps not even reaching them). The goals are to make the moves natural. This should emulate a camera operator, and should give the viewer context.

The user interface also includes a set of controls that the operator uses to create a video effect. For example, there is a "Freeze" button. When an operator sees an interesting scene in the event for which the operator wants to create the video effect, the operator will push the "Freeze" button. In response to the "Freeze" button, the computer 40 will freeze the video buffer so that no more video frames will be added to the video buffer or removed from the video buffer. In some embodiments, the system will continue to collect video until the trailing buffer is filled. The operator will then be provided with the ability to create a script. After a script is created, the user can preview the video effect and, if satisfied, the user can instruct computer 40 to create the final output video.

Figure 6:
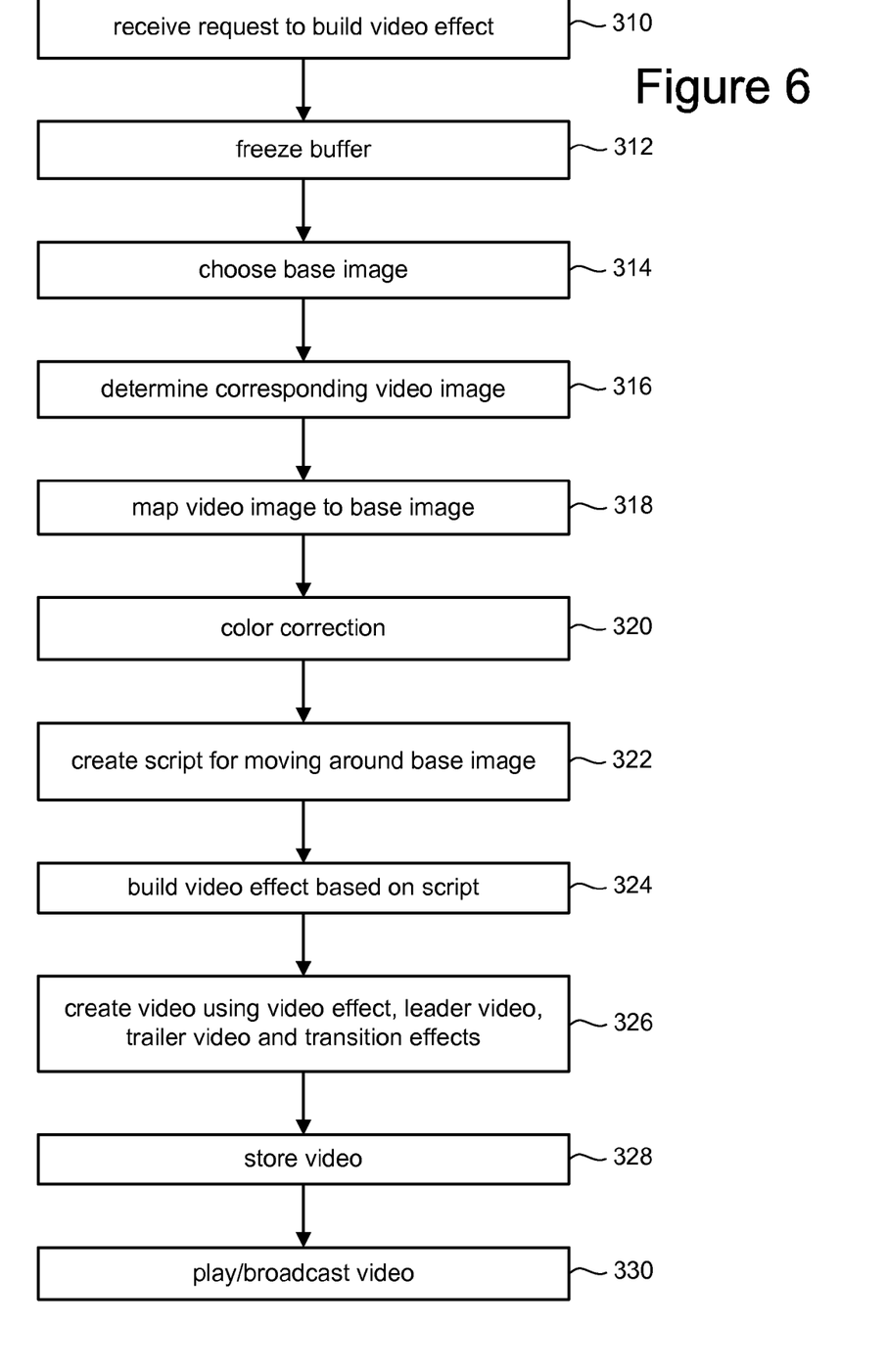
FIG. 6 is a flow chart describing one embodiment of a process for creating a video using the technology described herein.

FIG. 6 is a flowchart describing one embodiment for creating a video. In one implementation, the process of FIG. 6 is performed by computer 40. In step 310, computer 40 receives a request to build a video effect. For example, the user will push/activate the "Freeze" button on the user interface of computer 40. In step 312, computer 40 will freeze the video buffer, as described above. In step 314, the user will choose a digital still image from those images reported on the user interface. That chosen still image will be the base image for creating the video effect. In step 316, computer 40 will determine the video image from the set of video images in the video buffer that most closely corresponds to the chosen base image. In one embodiment, computer 40 will look for the video image that is closest in time to the chosen base image. This is done by looking at the timestamp for the digital image and comparing it to the timestamps of the video images in the video buffer, taking into account the offsets discussed above.

Figure 7:
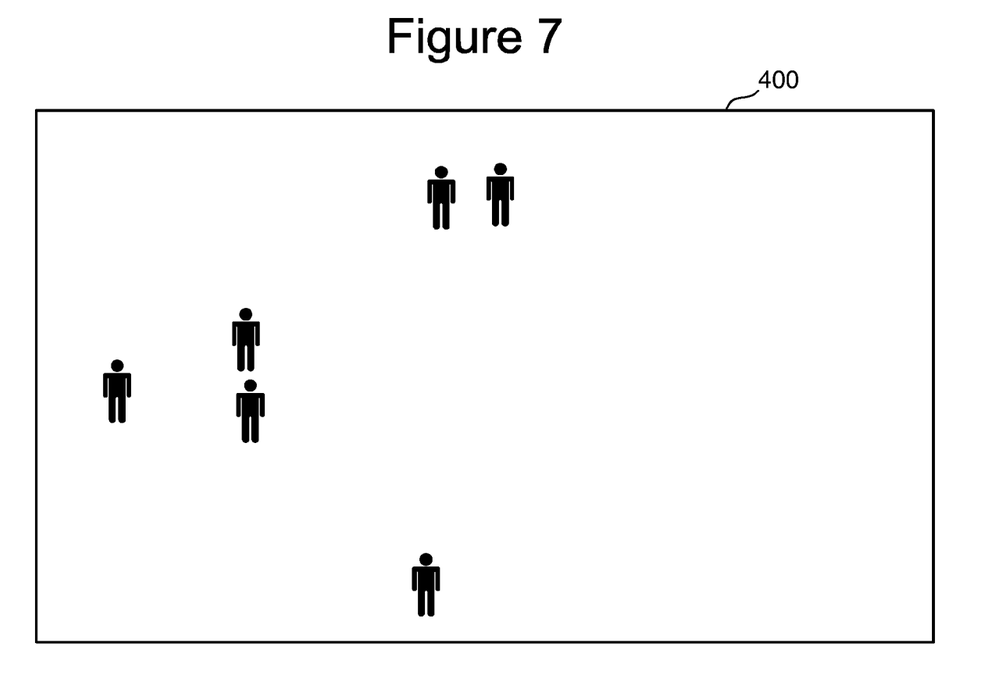
FIG. 7 depicts a base image.
Figure 8:
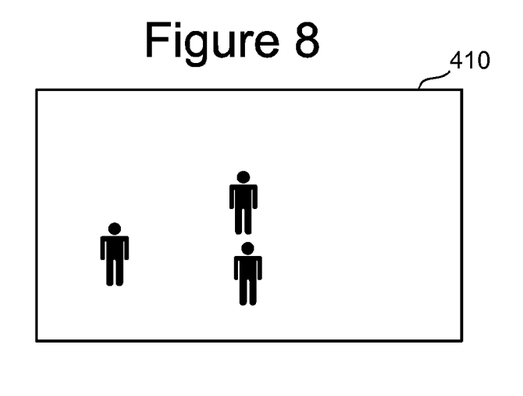
FIG. 8 depicts a video image.

As described above, digital camera 30 is co-located with broadcast camera 32 so that they will shoot picture images of the same scene/event; however, the still camera will typically capture a much larger field of view of the scene/event. In one embodiment, digital camera 30 has a higher resolution than broadcast camera 32 and has a much wider field of view. In those embodiments the image from broadcast camera 32 is likely to represent a portion of the image received from digital camera 30. In many situations, the image from broadcast camera 32 will entirely fit inside the image from digital camera 30. In some embodiments, the image from broadcast camera 32 will be similar to or appearing the same as the image from digital camera 30. It is not likely (although possible) that they are exactly the same on a pixel by pixel basis. In some instances, the image from the broadcast camera will partially overlap with the image of the digital camera and part of the image form the broadcast camera will not be depicted in the image from the digital camera. In any of these cases, the image from the broadcast camera 32 still depicts a portion of the image form the digital camera 30. FIG. 7 provides an example of an image 400 received from digital camera 30. Image 400 depicts a scene with six people in the scene. FIG. 8 depicts image 410 received from broadcast camera 32. Image 410 depicts three of the six people from FIG. 7.

Figure 9:
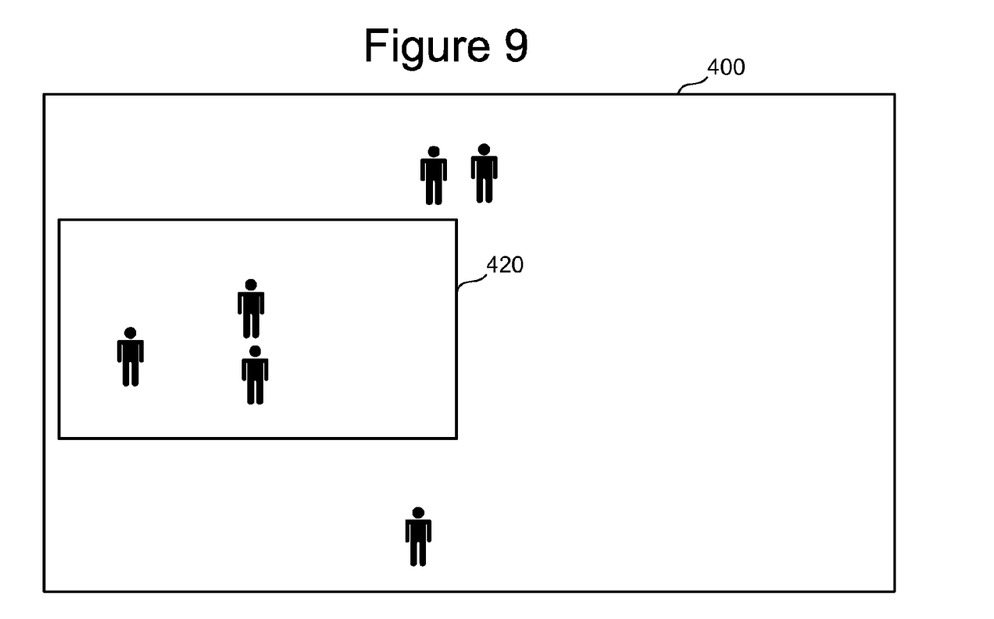
FIG. 9 depicts a video image matched to a base image.

In step 318, computer 40 will map the video image to the base image. As described above, in one embodiment the video image depicts a portion of the base image. Note that the video image and the portion of the base image may not match on a pixel by pixel basis due to differences in alignment, distortion, parallax, resolution, etc. Step 318 includes determining a mapping between the video image and a portion of the base image. The results of step 318 are depicted in FIG. 9, with rectangle 420 indicating the position of the video image 410 within base image 400. In many cases, the mapping will not likely be a rectangle. It will also likely have some "twist" relative to the base image. There are many ways to match the video image to the base image. In one embodiment, image recognition analysis is used. There are many techniques known in the art for "stitching" images together to create panoramic images or other types of images. These techniques typically recognize features that are in both images and overlay/align the images based on the features found in both images. This stitching technology can be used to match the video image to the base image. One example of suitable technology includes a method for image feature generation called the Scale Invariant Feature Transform (SIFT), which is described in the article "Distinctive Image Features from Scale-Invariant Key Points," by David G. Lowe, Computer Sciences Department, University of British Columbia, International Journal of Computer Vision, 2004; and "Object Recognition from Local Scale-Invariant Features," by David G. Lowe, Computer Sciences Department, University of British Columbia, Proceedings of the International Conference on Computer Vision, Corfu (September 1999). This technology is also used in a SIFT library available from the University of British Columbia. Other image recognition technologies can also be used to recognize common features in both the video image and still image in order to align/match the two images in step 318.

In step 320, a color correction process is performed. Computer 400 attempts to match the color balance in the video image and base image. In one embodiment, the system will create a histogram (or data representing a histogram since an actual histogram is not graphically plotted) of all the colors used in the video image and a histogram of all the colors used in the region of the still image that maps to the video image. The histograms plot color ranges versus number of pixels. The two histograms will be compared and one of the images will have its colors re-mapped so that the histograms more closely agree. In other embodiments, other means for performing color correction can be used. The object of the color correction is for the images to look as similar as possible. While the images may be of the same scene, the two cameras (30 and 32) may capture images with slight color variations. Thus, step 320 is used to make images look as similar as possible so the transition between images when building the video will be less perceptible. In some embodiments of the system of FIG. 6, step 320 is optional and is not performed. In some implementations, the user will have a box to check in the user interface of computer 40 to indicate whether a color correction process should be performed.

In step 322, the user can create a script moving (and sizing) the Field of View (FOV) within the base image. In some embodiments, the user can also rotate, warp, or change the FOV in other ways. In one embodiment, the user will choose a set of sub-images within the base image, the order that the sub-images will be presented, and the zoom level for each sub-image (as well as pan-tilt-zoom rates, pause times. etc.). This information will define the script. In step 324, computer 40 will build the video effect based on the script. In step 326, computer 40 will build a video which includes the video effect, leader video, trailer video and (optionally) transition effects, all which will be discussed below. Note that the leader and trailer are optional. In step 328, the video created in step 326 is stored. In step 330, that stored video can be played for the user, recording, or broadcast.

Figure 10:
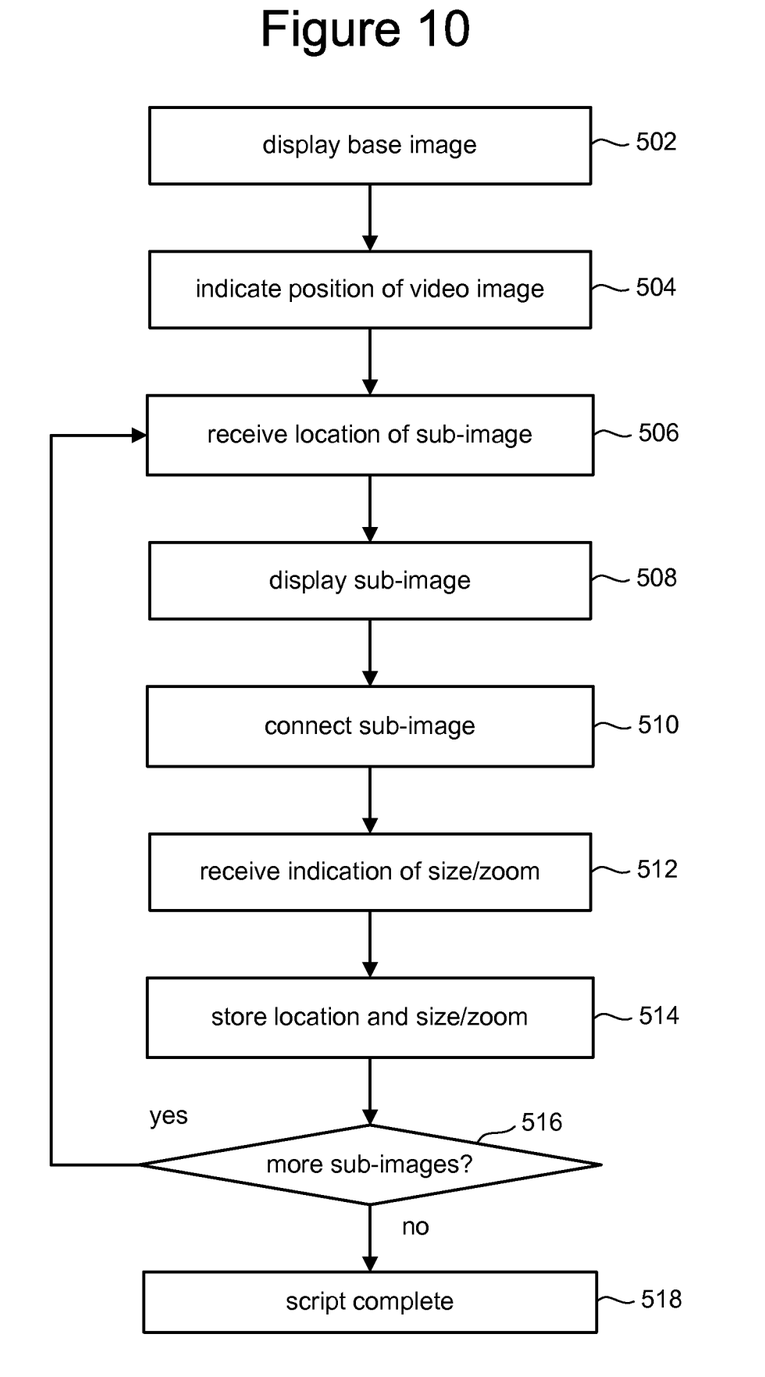
FIG. 10 is a flow chart describing one embodiment of a process for creating a script.

FIG. 10 is a flowchart describing one embodiment for creating a script. FIG. 10 provides an example implementation of step 322 of FIG. 6. In step 502 of FIG. 10, the user interface for computer 40 will display the still image chosen in step 314. In step 504, the user interface will also indicate the position of the video image within the still image, for example, as depicted in FIG. 9 by rectangle 420. In step 506, the user interface of computer 40 will receive a location, orientation, and size of a sub-image (or mapping of a sub-image). In one embodiment, the user will use a mouse to select a position within the base image for a sub-image. In step 508, that sub image will be displayed by the user interface. For example, the user interface will draw a rectangle representing the sub-image in the base image. In step 510, the sub-image will be visually connected to another sub-image in the user interface. If this is the first sub-image chosen, it will be connected to the representation of the video image (e.g., box 420). If it is the second sub-image, then the new sub-image will be connected to the first sub-image. If it is the third sub-image, then the new sub-image will be connected to the second sub-image, and so on. The connection is just a visual representation to show order of sub-images. The default order of the sub-images is the order that the user created the sub-images. In some embodiments, the user can change the order using the user interface. In step 512, the user interface for computer 40 will receive an indication of the size of the sub-image or zoom level. Each sub-image is identified by the user interface as a rectangle in the base image. In step 512, the user can make that rectangle bigger and smaller by dragging a corner of the rectangle. Making the rectangle smaller provides the effect of zooming in. Making the rectangle larger provides the effect of zooming out. In step 514, the computer 40 will store the location and size/zoom level for the sub-image. If the user has more sub-images to select, this process will loop back to step 506, and a new sub-image will be selected, connected to other sub-images and have the zoom level set. When the user is finished defining sub images, the script will be complete (step 518). In one embodiment, there will be a button on the user interface to indicate that the script is complete.

Figure 11:
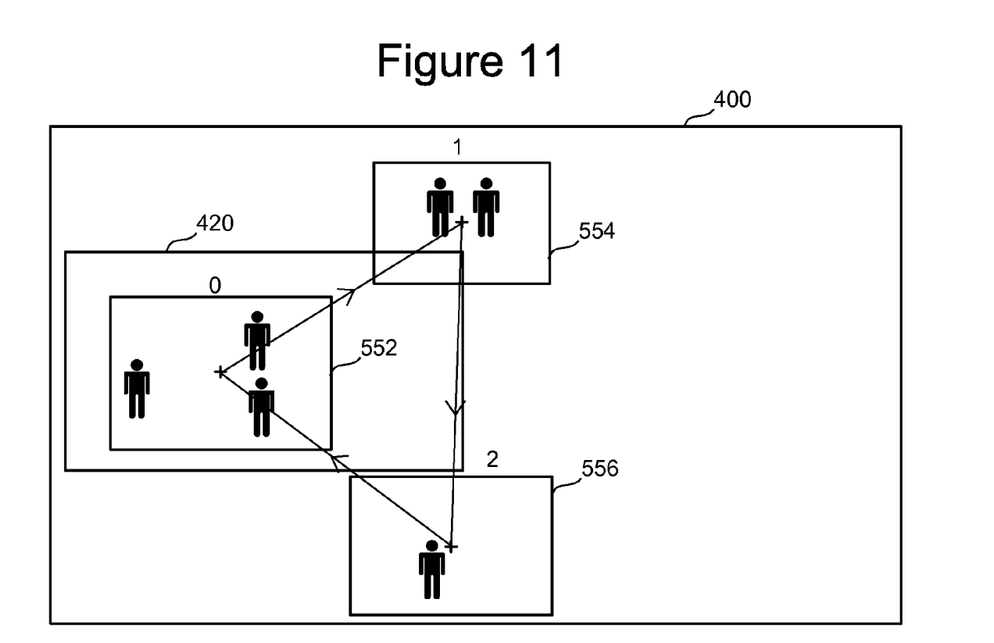
FIG. 11 depicts a base image with a graphic indication of a script.

FIG. 11 depicts a portion of the user interface that graphically depicts the script created by the user. As can be seen, the user has chosen three sub-images 552, 554 and 556. A line with an arrow is drawn between sub images to connect the sub-images and indicate the order of sub-images. The sub-images are also different sizes to provide different zooming effects. Each of the sub-images are numbered (e.g., 0, 1, 2).

Figure 12:
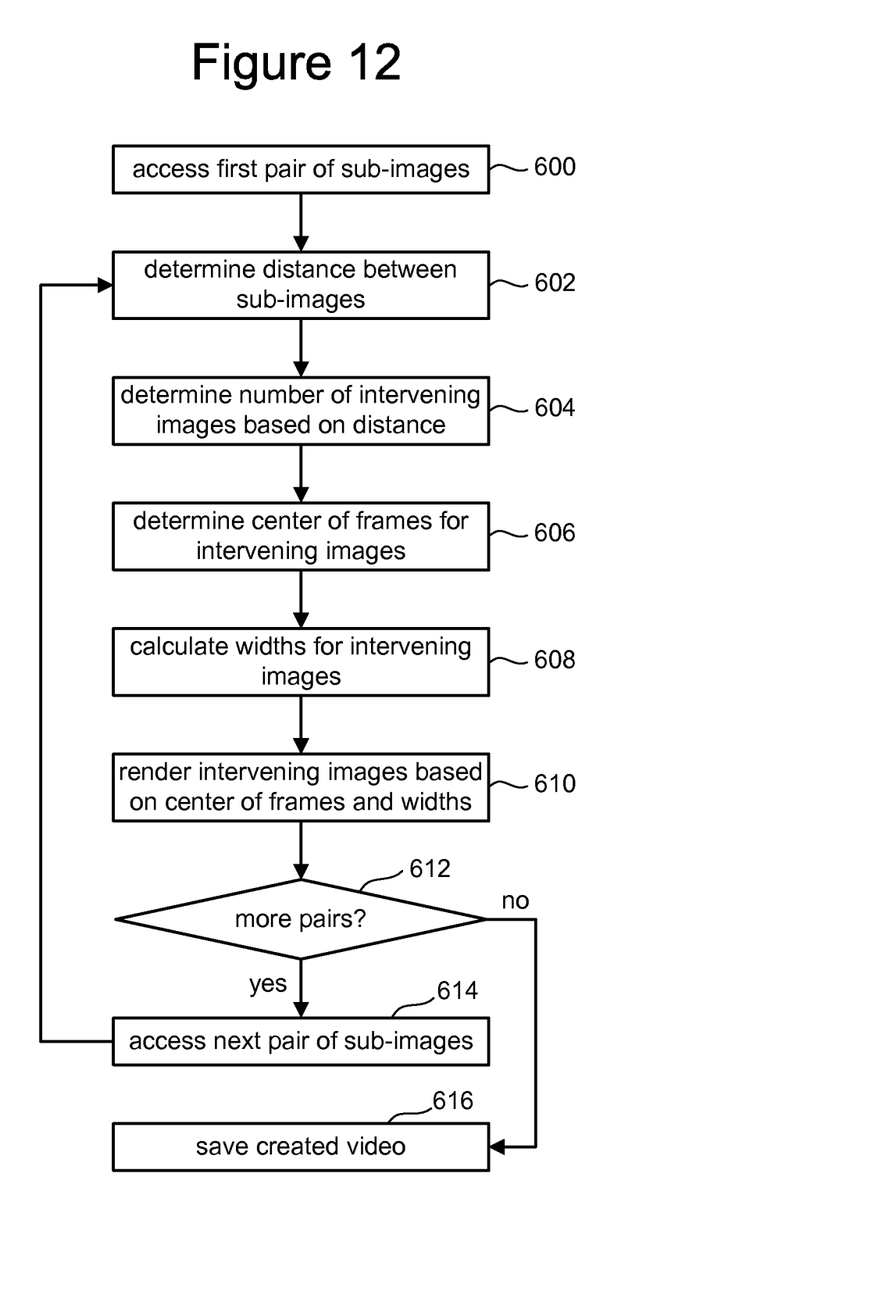
FIG. 12 is a flow chart describing one embodiment of a process for building a video effect based on a script.

FIG. 12 is a flowchart describing one embodiment of the process for building the video effect based on the script. In one implementation FIG. 12 provides more details of step 324 of FIG. 6. In step 600 of FIG. 12, the system will access the first pair of sub images. In this case, the system will access the first sub-image created by the user and the video image inside the base image. In step 602, the system will determine the distance between sub-images. For example, the distance in pixels between sub-image centers can be determined. In step 604, the system will determine the number of intervening images between the two sub images based on the distance in pixels and scale. Note that the intervening images between sub-images need not be along a straight line connecting any part of the sub-images. The user interface allows users to choose a speed parameter that defines how fast the system should transition between sub-images. The speed parameter (number of pixels to move per second) and the actual distance (in pixels) are used to create the number of intervening images. In one embodiment, the speed parameter is not a constant pixels/image; rather, it ramps up and back down. In step 606, the system will determine the center of the frames for each of the intervening images. In step 608, the system will determine the widths of the intervening images. In one embodiment, if there are ten intervening images between the sub-images, then the center of frames will be equal distance from each other on a line or curve connecting the center of the sub-images. The width for the intervening images is based on the zoom factors of the sub-images. In one embodiment, the system will zoom out between sub-images. A curve can be generated that defines the widths of the intervening images. The curve starts with the width of the first sub-image and ends at the width of the second sub-image, and has a mid-point set by the user interface and embedded logic. A smooth curve can be generated for all the width values for the intervening images. In another embodiment, rather than a smooth curve, a straight line or bell curve can be used. Other mathematical formulas or relationships can also be used to create the zooming effect.

In another embodiment, the distance between center of frames is spaced along a spline curve such that the apparent pan and tilt change in a manner that tries to mimic natural camera movement. That is, a smooth camera movement is simulated using a function of time to pixels and field of view, and that function can be a spline curve.

In one embodiment, the camera motion through the base image is defined as follows:
1. Given 2 defined sub-frames K0 and K1;
2. Determine center intermediate frame KC;
3. KC pos=½*(K0 pos+K1 pos) or evaluate cubic Bezier spline;
4. KC Width determined as follows:
   Factor: user defined
   Dist: distance between K0 pos and K1 pos
   MidW=½*(K0 Width+K1 Width)
   Ratio=Factor*Dist/MidW
   KC Width=Ratio*MidW
5. Build 2 cubic Bezier splines: one to smooth/interpolate center points and one to smoothly vary width.

In one embodiment, when computing the size of the intermediate frames between sub-frames, the system tests the computed "Ratio" against a user configurable number (e.g., 1.3 or another value appropriate for the particular implementation). If the "ratio" is found to be less than this threshold, then the system does not apply the ratio (or defines it to be 1.0). One of the effects of this is that it keeps the system from artificially zooming out when the move between sub-frames is primarily a zoom to begin with.

The process for creating the script may be accomplished using a pointing device and selecting sub-frames, defining a curve, or using other means of describing the general path, timing, sizing etc. for the FOV as it traverses the base image. In one embodiment, automation could be implemented to produce a script that mimics the actions of a live camera operator. This might be accomplished by computing acceleration and deceleration parameters related to the translation of the field of view, and/or by "zooming" out and then back in while translating between two sub-frames. Such motions offer greater perspective of the move and the event for the viewer, and feel more natural as they mimic the moves that are typical of a professional camera operator.

In step 610, the intervening images are rendered based on the center of frames, widths and orientations. In step 612, the system determines whether there are any more pairs of sub-images to consider. If not, the process is completed and the video effect is saved in step 616. If there are more pairs of sub-images to consider, then the next pair of sub-images are accessed in step 614 and the process loops back to step 602. After the video image and the first sub-image are considered, then the first sub-image and the second sub-image are accessed, and so on. In some embodiments, there may only be one sub-image in addition to the video image. In other embodiments, there can be many sub-images. One variation of the process depicted in FIG. 12 contemplates that after the number of intervening frames is determined, for each intervening frame, its center and width can be determined and then immediately rendered instead of determining all of the centers, then determining all the widths and then rendering. Other orders for performing the determining of intervening images widths and rendering can also be implemented. In one embodiment, the rendering of the video is performed using OpenGL in the video card for computer 40.

In one implementation, the video effect includes the exact sub-images identified by the user. In other implementations, the video effect can use sub-images that are close to, but not exactly the same as, the sub-images chosen by the operator.

In one embodiment, the video effect can be created in real time by an operator. In such an embodiment, there would be no need for a script.

Figure 13:
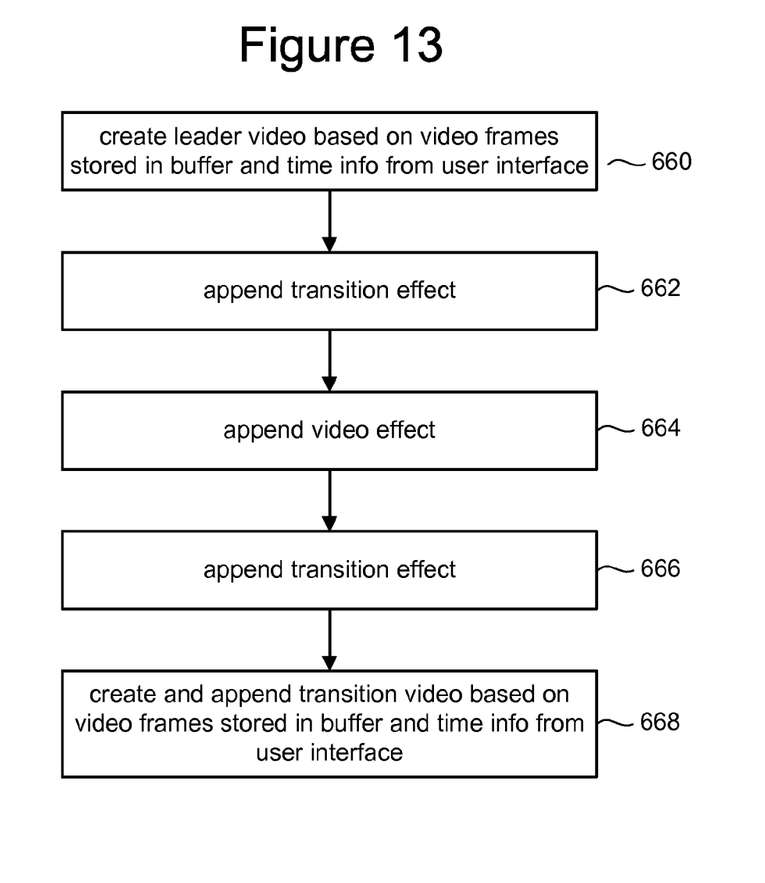
FIG. 13 is a flow chart describing one embodiment of a process for creating a video that includes a video effect.

FIG. 13 is a flowchart describing one embodiment for creating a video. In one embodiment, the process of FIG. 13 is used to implement step 326 of FIG. 6. In step 660 of FIG. 13, leader video is created. The leader video includes the video frame identified in step 316 as corresponding to the base image and the video frames earlier in time that are still in the video buffer. The user interface will include a field (or other means) for the user to indicate how long the leader video should be. Based on that information, previous video frames from the video frame identified in step 316 will be assembled and packaged into a leader video. In step 662, a transition effect is optionally provided. In one embodiment, the last image in the leader video is the video image identified in step 316. After that image, the video will transition to the portion of the still image that corresponds to or is matched to the video image (see step 318 of FIG. 6). In many cases, that transition will be very smooth and imperceptible to the viewer. Thus, the transition may not include any special effects and no transition effect will be added. A transition that does not include a special effect can be referred to as a cut. In other embodiments, the transition may be perceptible to the viewer because the video camera and still camera may have slight different points of view, different color variations, different rotations, different issues with the lenses, etc. Thus, to hide the variations in the two images, a transition effect will be added. One example is to create a shutter effect which can include a simulated flash and/or a simulated closing of a shutter of a camera. Other effects can also be used. That transition image or images are appended in step 662.

In step 664, the video effect created in FIG. 12 is added to the video. In step 666, another transition effect can optionally be added. At the end of the video effect, the video created in FIG. 13 will transition from the matched portion of the base image to the video image identified in step 316. The same transition used in step 662 can be used in step 666, or a different transition can be used. Note that the video effect includes a video that starts at the matched location in the base image and moves around the base image to all the sub-images with the zoom level being changed as described above. The video effect will typically end with the video moving back to the matched portion of the base image and transitioning back to the corresponding video image. In step 668, a trailer video is created. The trailer video first includes the video frame identified in step 316 and subsequent video frames received from video camera 32 that are stored in the video buffer for a period of time identified by the user in the user interface of computer 40. That trailer is then appended to the video created in FIG. 13 to create the final video.

Figure 14:
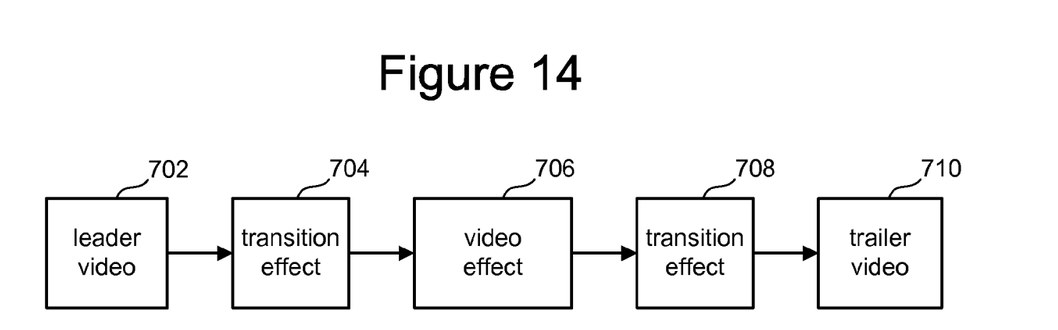
FIG. 14 depicts the components of a video created using the technology described herein.

FIG. 14 graphically depicts the components of the video created by the process of FIG. 13. The first component is leader video 702. The second component is the transition effect 704, which is optional because in some cases the transition will not use a special effect. The transition effect can include zero, one or more frames of video. The third component is the video effect 706, which includes a set of video frames that depict moving around the base image to the various one or more sub-images. The fourth component is transition effect 708, which can include zero, one or more frames of video, followed by the trailer video 710.

Figure 15:
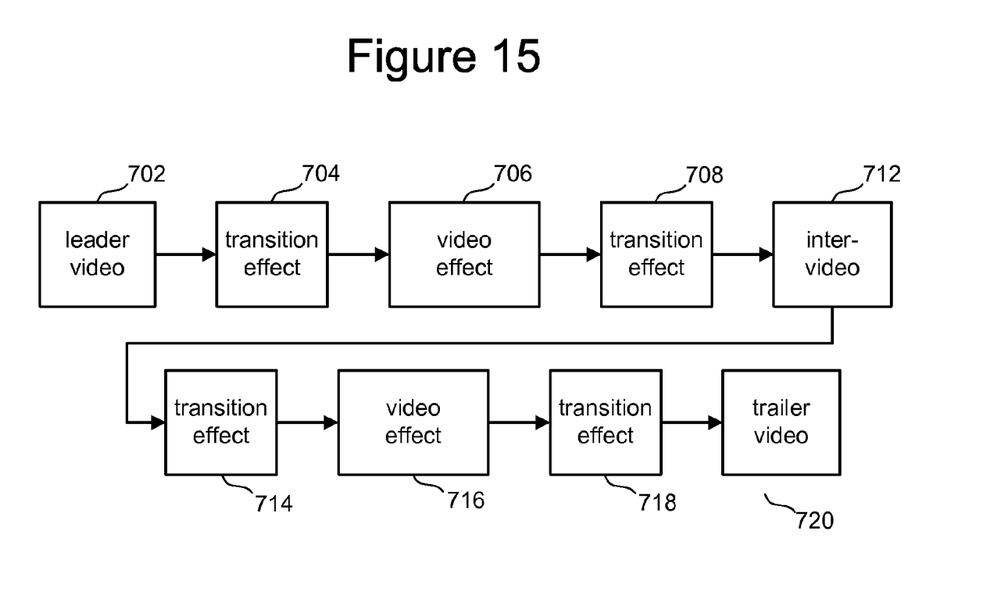
FIG. 15 depicts the components of a video created using the technology described herein.

Another embodiment of a video created for the technology described herein is depicted in FIG. 15. In this example, there are two video effects. The video includes leader video 702, followed by transition effect 704, followed by video effect 706, followed by transition effect 708, followed by intermediate video 712, followed by transition effect 714, followed by video effect 716, followed by transition effect 718, and trailer video 720. To create the video of FIG. 15, the process of FIG. 10 is performed twice in order to create two scripts, a first script for video effect 706 and the second script for video effect 716. The process of FIG. 12 is performed once to create video effect 706 and a second time to create video effect 716. When performing the process of FIG. 13, additional steps are added at the end of the process to add the additional transition, video effect, transition and trailer video.

Figure 16:
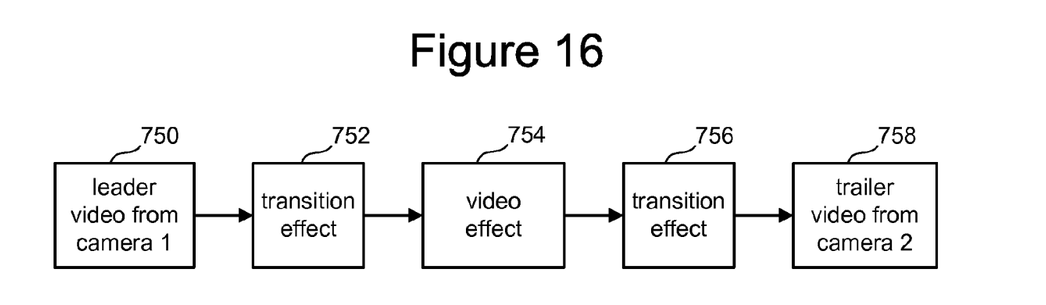
FIG. 16 depicts the components of a video created using the technology described herein.

In the embodiments described above, the video created by the process of FIG. 13 starts with a video frame from a first camera and end in the same video frame for that same camera. In another embodiment, the video created by FIG. 13 can start in a video frame from a first camera but end in a video frame from a second camera. For example FIG. 16 shows leader video 750 from a first camera followed by a transition effect 752. The transition effect 752 is used as a transition between the video frame from the first camera and video effect 754. After video effect 754, there will be a transition 756 to trailer video 758. However trailer video 758 is comprised of one or more frames from a second camera. Thus, the process will include a step for matching a frame of video from the second camera to the base image and the script will end at that matched location in the base image corresponding to the video frame from the second camera. The additional frames of video in the trailer 758 will be later in time video frames captured from the second camera.

In one embodiment, camera interface 34 will send thumbnails of the images prior to sending the actual digital images. This way, the user interface can display the thumbnails before receiving images to give the user an earlier look at potential video effects to build.

In one embodiment, a digital video camera can be used to implement camera 30 instead of a digital still camera. In one embodiment, a high resolution digital video camera can be used to replace both digital still camera 30 and the broadcast camera 32. The digital video camera would include a very wide field of view. A portion of that field of view (a standard definition image or high definition image) is cut out and used for broadcast. That portion that is cut out can be used as the video images described above. Note that the portion cut our can be any of various number of pixels and then mapped to the desired format. The original "complete" image from the digital video camera will act as the base image described above. Because the broadcast image is cut out from the base image, the matching step is already performed.

In another embodiment, instead of using a high resolution digital still camera, multiple digital still cameras can be used and those images can be stitched together to create a high resolution still image for the base image.

The video effect described herein allows a user to see portions of the base images that are not visible in the video image. In addition, because the base image is at a higher resolution than the video image, the video effect can zoom in on the base image with much greater clarity than it could on the video image (this may also be true because the system can use a faster shutter speed on the still camera)

In one embodiment, the video effect described above is created during a live event, but not in real time. That is, the video effect is created after the action happens but is broadcasted during the live event.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of creating a video effect, comprising:
 identifying a particular video image and a corresponding base image, said particular video image is from a first video camera at an event, said base image is a still image from a second camera co-located with said first video camera at said event, said base image is of higher resolution than the particular video image, said base image depicts said event frozen in time, said particular video image depicts a portion of said base image;
 identifying two or more sub-images that are portions of said base image, one of the sub-images also appears in the particular video image; and
 identifying leader video from said first video camera, said leader video includes said particular video image;
 identifying trailer video from said first video camera; and
 creating, using a processor, a new video that includes said leader video from said first camera, a transition from said particular video image to said base image, virtual camera movement within said base image between said sub-images, a transition from said base image to said trailer video from said first camera and said trailer video from said first video camera;
 said new video provides an experience of freezing time in a video presentation of said event based on video from said first video camera, investigating the event during that frozen moment in time by said virtual camera movement, and resuming the action of the event in the video from said first video camera.

2. A method according to claim 1, further comprising:
 accessing an identification of an order of said sub-images, said virtual camera movement within said base image is defined by said indication of said sub-images and said identification of said order.

3. A method according to claim 1, wherein:
 said base image and said particular video image are not exactly identical; and
 said base image and said particular video image are in an electronic format.

4. A method according to claim 1, wherein:
 said transition includes a camera shutter effect.

5. A method according to claim 1, wherein:
 said transition does not include any special effects.

6. A method according to claim 1, wherein:
 said trailer video includes said particular video image and at least of one or more additional video images from said first video camera at said event.

7. A method according to claim 1, wherein:
 said second camera is mounted on said first video camera.

8. A method according to claim 1, wherein:
said movement in said base image includes zooming in on said portion of said base image.

9. A method according to claim 1, wherein said identifying said particular image and said corresponding base image comprises:
receiving a plurality of images and time codes for said plurality of images, said plurality of images includes said base image, said time codes include a time code corresponding to said base image;
receiving said group of video images and storing said group of video images in a data store;
receiving a selection of said base image; and
using said time code corresponding to said base image to identify said particular video image.

10. A method according to claim 1, further comprising:
mapping said particular video image to a portion of said base image.

11. A method according to claim 10, further comprising:
correcting color on at least one of said base image or said particular video image to increase similarity between said portion of said base image and said particular video image.

12. A method of creating a video effect, comprising:
receiving a first image captured from a first camera that is a video camera, said first image depicts a first event;
receiving a base image captured from a second camera that is co-located with the first camera and captures images at a higher resolution than said first camera, said base image is a still image that depicts said first event frozen in time, said first image fits within said base image;
identifying two or more sub-images in said base image;
identifying leader video from said first camera, said leader video includes said first image;
creating a video that includes said leader video, a transition from said first image to said base image and virtual camera movement within said base image to provide an experience of freezing time in a video presentation of said first event based on video from said first camera and investigating the event during that frozen moment in time by said virtual camera movement.

13. A method according to claim 12, wherein:
said creating a video includes mapping said first image to a portion of said base image.

14. A system for creating a video effect, comprising:
a communication interface, said communication interface is in communication with one or more sources of images;
a storage system; and
one or more processors in communication with said storage system and said communication interface, said one or more processors receive still images from a sensor, receive video images from a video camera that is co-located from said sensor, identify a particular video image from the received video images and corresponding base image from the received still images, match said particular video image to a portion of said corresponding base image, identify leader video from said video camera that includes said particular video image, and create a new video that includes said leader video and transitions from said particular video image to said matched portion of said corresponding base image and includes virtual camera movement within said corresponding base image, said base image is a still image that freezes time during an event, said new video provides a visual experience of freezing time in a video presentation of said event based on video from said first camera and investigating the event during that frozen moment in time by said virtual camera movement.

15. A system according to claim 14, wherein:
said one or more processors access multiple sub-images that are portions of said corresponding base image;
said new video includes said multiple sub-images; and
said virtual camera movement within said corresponding base image is created by said new video sequentially presenting said one or more sub-images.

16. A system according to claim 14, wherein:
said one or more processors receive an indication of a set of sub-images in said corresponding base image;
said one or more processors automatically determine additional sub-images that are portions of said corresponding base image and that are spatially between said set of sub-images; and
said virtual camera movement within said corresponding base image is created by said new video sequentially presenting said set of sub-images and said additional sub-images.

17. A system according to claim 14, wherein:
said one or more processors receive an indication of a set of sub-images in said corresponding base image and zoom levels for said sub-images; and
said virtual camera movement in said corresponding base image includes virtual camera movement between said sub-images with varying zoom levels during said virtual camera movement, said varying zoom levels are based on said zoom levels for said sub-images.

* * * * *